United States Patent [19]

Lewkowicz

[11] Patent Number: 4,896,145

[45] Date of Patent: Jan. 23, 1990

[54] FIXTURE FOR MOUNTING A LAMPHOLDER AND FIRE DETECTOR

[75] Inventor: Mike Lewkowicz, Wayside, N.J.

[73] Assignee: Life Light, Inc., Oakhurst, N.J.

[21] Appl. No.: 202,050

[22] Filed: Jun. 3, 1988

Related U.S. Application Data

[63] Continuation-in-part of Ser. No. 840,146, Oct. 6, 1986, abandoned.

[51] Int. Cl.[4] .......................... G08B 23/00; H02J 7/00; F21V 33/00

[52] U.S. Cl. ....................................... 340/693; 307/66; 340/584; 340/628; 362/253

[58] Field of Search ......................... 340/693, 628–630, 340/584; 174/61; 362/253; 307/66, 64, 23

[56] References Cited

U.S. PATENT DOCUMENTS

| | | | |
|---|---|---|---|
| 4,090,178 | 5/1978 | Norris | 340/693 X |
| 4,255,746 | 3/1981 | Johnson et al. | 340/584 X |
| 4,257,039 | 3/1981 | Webb et al. | 362/253 X |
| 4,374,406 | 2/1983 | Hepp | 362/253 |
| 4,528,620 | 7/1985 | Weber | 362/253 X |
| 4,694,285 | 9/1987 | Scripps | 340/693 |
| 4,702,452 | 10/1987 | Penar | 340/693 X |
| 4,717,910 | 1/1988 | Scripps et al. | 340/693 |
| 4,812,827 | 3/1989 | Scripps | 340/693 |

*Primary Examiner*—Glen R. Swann, III
*Assistant Examiner*—Thomas J. Mullen, Jr.
*Attorney, Agent, or Firm*—Lerner, David, Littenberg, Krumholz & Mentlik

[57] ABSTRACT

A combined light and fire detector fixture mountable on a recessed electrical box having a housing, mounting means to mount the housing to the electrical box, a light fixture having lamp holding means, mounting means for mounting the light fixture to the housing and electrical conducting means for coupling the lamp holding means to a switch and an alternating current power source, and fire detecting means including smoke or heat sensing elements and being mounted to the outside of the housing to provide easy access thereto and to decrease the heat generated within the housing and electrical box.

14 Claims, 3 Drawing Sheets

FIXTURE FOR MOUNTING A LAMPHOLDER AND FIRE DETECTOR

This is a continuation-in-part of U.S. Ser. No. 07/840,146 filed Oct. 6, 1986, now abandoned.

BACKGROUND OF THE INVENTION

This invention relates generally to lighting fixtures and fire detectors, and more particularly to a combined light fixture and fire detector for simultaneous mounting on a recessed electrical outlet box.

The concept of combining a lighting fixture and fire detector has been shown in at least two patents, specifically, U.S. Pat. Nos. 4,090,178 to Norris and 4,255,746 to Johnson, et al. The patent to Johnson, et al. discloses a home safety unit which includes an emergency light system and a fire detection system, wherein the lighting fixture is fixed to the outside of a housing and the fire detection system is mounted within the same housing. The smoke detector and light fixture disclosed in the Norris patent is similar in that the fire detector is concealed within a housing. An alternate embodiment disclosed in the Norris patent situates the smoke detecting element of the smoke detector at a distance from the electrical box by means of an electrical conduit, thereby requiring an additional hole to be cut in the ceiling.

The shortcomings of the fixtures disclosed in the Johnson, et al. and Norris patents should be readily apparent to one of ordinary skill in the art. These shortcomings include the requirement that additional holes be provided in the housing to permit detection of smoke by the fire detecting element. Further, since the smoke detecting means is mounted within the housing, maintenance and repair of the same becomes difficult, as this would require removal of the lamp diffuser, the lamp and the housing itself. More importantly, such maintenance and repair can only be safely accomplished by cutting off the main power source and disconnecting the leads of the fixture from the leads of the electrical box, so as to gain access to the smoke detection means.

Further, electrical devices of this type must meet certain minimum standards under the applicable building and electrical codes, or the more stringent standards of an independent testing organization, as is desirable when placing such a device into the commercial marketplace. Such standards normally require heat and electrical tests at different points about the lighting or other electrical fixture, at least one of such points exists within the electrical outlet box or within the housing of the type shown in the aforementioned patents. Thus, placement of the fire detecting means within a housing will have an adverse affect upon these heat and electrical tests, as more heat will be generated and trapped therein.

In providing fire safety systems, it is often desirable to provide fire detectors having a heat sensing element in addition to or in place of a smoke detecting element, since the heat generated by a fire might be detected before the smoke. The devices disclosed in Norris and Johnson, et al. do not provide an adequate design to include heat sensing elements because the heat generated within the housing and electrical box might trigger the heat sensing element under normal operating conditions.

As building and fire codes become more stringent, it is desirable to provide a combined light and fire detector fixture which can be directly mounted onto a recessed electrical outlet box and cures the above-noted shortcomings of the prior art fixtures.

Accordingly, the present invention provides a single fixture for mounting a fire detector and a lamp holder to a single recessed electrical outlet box, which single fixture can be readily mounted in residential dwellings by homeowners or in any other setting, new or old, by an experienced builder or electrician. The use of conventional lighting fixtures and fire detectors facilitates the commercial practicability underlying the present invention.

SUMMARY OF THE INVENTION

The present invention covers a single fixture adapted to secure both a light fixture and a smoke or heat detector to a single recessed electrical outlet box in a ceiling or a wall, having a housing assembly with mounting means provided thereon, lamp holding means connected to the housing assembly and fire detecting means connected to the outside of the housing assembly and including an audible or visual alarm mechanism and a smoke detecting or heat sensing element for triggering said alarm mechanism upon detection of fire. The light fixture and the fire detector means both include conducting means coupled to the same alternating current power source, the fire detecting means further including battery means for operating the same when the power source is turned off or fails due to a power failure or other error.

Accordingly, it is an object of the present invention to provide a combined light and fire detector fixture which can be readily mounted by a homeowner or experienced electrician to a single recessed electrical outlet box.

It is another object of the present invention to provide a combined light and fire detector fixture where the fire detector is mounted on the outside of the fixture thereby avoiding the introduction of additional heat within the fixture and the electrical outlet box.

It is another object of the present invention to provide a combined light and smoke detector fixture where simple repairs and maintenance of the fire detecting means can be accomplished without demounting the fixture from the electrical outlet box or turning off the main power source.

It is yet another object of the present invention to provide a combined light and fire detector fixture where the fire detecting means includes a rechargeable battery means to energize the same, should the alternating current power source fail.

These and other objects will become apparent, as will a better understanding of the concepts underlying the present invention, by reference to the description which follows when taken in conjunction with the accompanying drawings:

DETAILED DESCRIPTION OF THE INVENTION

Figure 1:
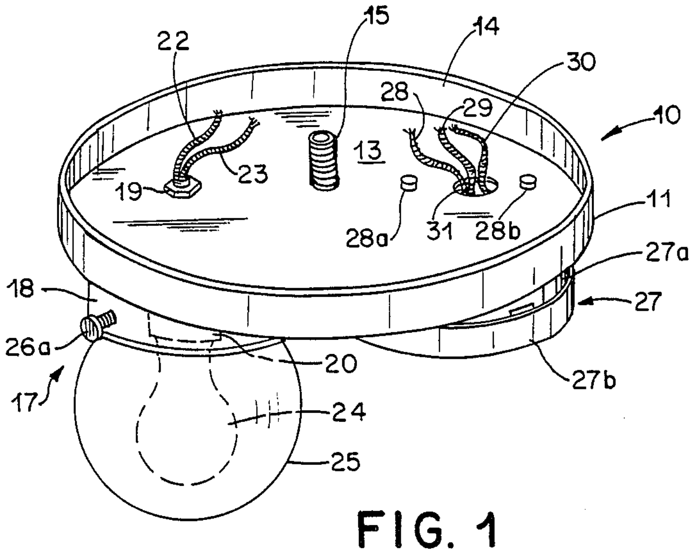
FIG. 1 is a perspective view of the combined light and fire detector fixture in accordance with the present invention.
Figure 2:
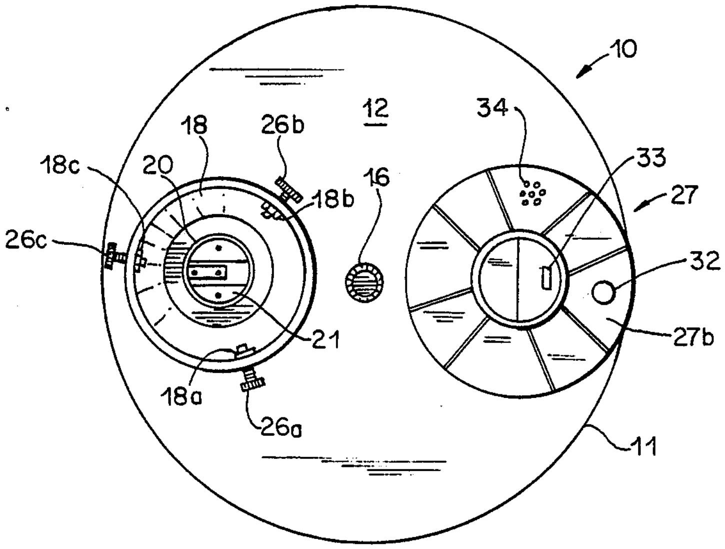
FIG. 2 is a plan view of the light and smoke detector fixture shown in FIG. 1, illustrating in particular the arrangement of the light fixture and the fire detector thereon.
Figure 3:
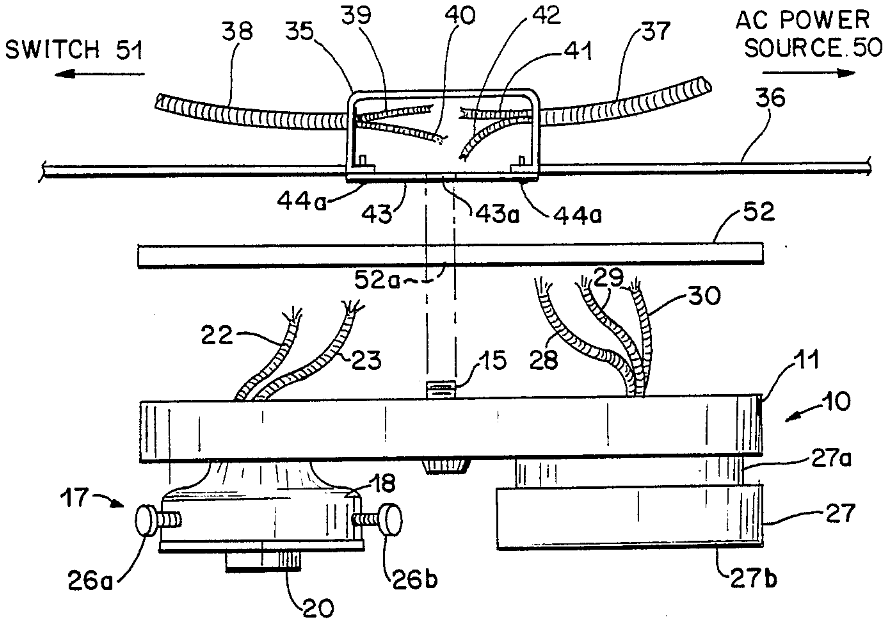
FIG. 3 is a side view of the fixture shown in FIGS. 1 and 2 together with a partial cross-sectional view of an electrical box recessed in a ceiling, illustrating a mounting arrangement in accordance with the present invention.

Referring to the drawings, FIGS. 1-3 illustrate the preferred embodiment of the combined light and fire detector fixture generally designated as 10 in accordance with the present invention.

The combined light and fire detector fixture includes a housing 11 made of sheet metal or any other suitable material and having an exterior surface 12 and an interior 13 defined by side wall 14 which extends perpendicularly from, and about the perimeter of, the exterior surface 12. The housing further includes a centrally located mounting means 15, comprised in the illustrated embodiment of a threaded member having a decorative cover 16 to maintain the aesthetics of exterior surface 12, and one aperture for mounting the light fixture and a second aperture 31 to provide through access for the leads of the fire detector.

The fixture 10 further includes a light fixture generally designated as 17 and having a canopy 18 with light fixture mounting means 19 and a lamp base 20. The canopy 18 can be stamped from a sheet of metal or any other suitable material. The lamp base 20 is preferably made from a ceramic material, is cylindrically shaped and includes a metal screw shell 21 riveted to the interior thereof. Lamp leads 22 and 23 are connected, by soldering or the like, to metal screw shell 21 and are adapted for connection to an alternating current (hereinafter AC) power source or circuit.

An incandescent lamp 24, of the A-type or the R-type is threaded into screw shell 21, thus providing the conductive contacts to the filaments of lamp 24 which will emit light by glowing when the AC power is on. The lamp can be of virtually any wattage up to 100 W. A round glass diffuser 25 is disposed about lamp 24 and is held in place by thumb screws **26*a*, 26*b* and 26*c*, each of which is threadedly disposed through bushings 18*a*, 18*b* and 18*c* of canopy 18 to engage diffuser 25 and secure the same in assembled position. Diffuser 25 could include a flared lip at its upper end (not shown) which will facilitate the securing thereof by said thumb screws. Diffuser 25** can be of any shape or size to meet particular light requirements or decor.

The fire detecting means of fixture 10 generally designated as 27 in the drawings is mounted, as shown in FIG. 1, to the housing 11 by means of sheet metal screws **28*a* and 28*b* which have been threaded through exterior surface 12 and bushings, and protrude into interior 13. Of course, any suitable means can be used to mount fire detecting means 27 to fixture 10. The fire detector 27 is comprised of base 27*a*, which houses the detector circuitry and rechargeable battery means, and detector cover 27*b* to enclose such circuitry and provide a pleasing aesthetic appearance. The fire detector leads 28, 29 and 30 from the fire detecting means 27 extend through aperture 31 in housing 11 for connection to an AC power source 50. Lead 29 is connected to the fire detecting means 27 to operate the smoke detecting element or heat sensing element (not shown) and audible or visual alarm mechanism (not shown), while lead 30 is connected to the fire detecting means 27 to operate test light 32, as shown in FIG. 2, and lead 28 provides the ground for the circuitry of the fire detecting means 27**.

It is imperative to note that the fire detector 27 of the present invention is typical of smoke or fire detectors which are commercially available in the marketplace, the fire detector 27 of the present invention being particularly adapted for use with an AC power source 50 and further providing a rechargeable battery (not shown) in the event of a power failure of course, the fire detector 27 of the present invention is provided with means for recharging the rechargeable battery and rectifying means to permit the operation of the fire detector 27 by AC power or direct current (hereinafter DC).

Further reference to FIG. 2 reveals test button 33 on fire detector 27 which can be depressed to light test light 32 thereby indicating that the power and/or circuitry of detector 27 is in operating condition. Also shown in FIG. 2 are holes 34 in detector cover **27*b*** to expose the smoke detecting element or heat sensing element to the ambient conditions.

Referring specifically to FIG. 3, the manner in which the fixture 10 is mounted can be readily observed. Thus, an electrical outlet box 35 is recessed within a ceiling defined by wallboard 36. Electrical conduit 37 carries the two conductor lines of the household power from a fuse box or breaker switch, while electrical conduit 38 carries conductor lines to a switch. Thus, conductors 39, 40, 41 and 42 are exposed in electrical outlet box 35 for connection to lamp leads 22 and 23 of light fixture 17 and fire detector leads 28, 29 and 30 of fire detector 27, as shown in the schematic of FIG. 3A.

Figure 3A:
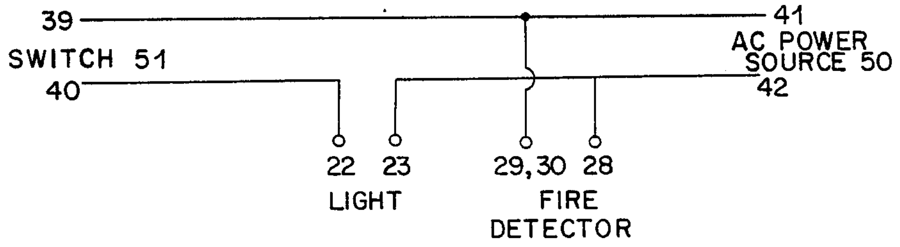
FIG. 3A is a schematic diagram showing the preferred wiring arrangement for the fixture shown in the preceding Figures.

The schematic in FIG. 3A specifically shows that fire detector 27 continually receives the alternating current, as leads 29 and 30 are connected to the "hot" conductor 41 from the AC power source 50 and lead 28 is connected to the "ground" therefor. The light fixture 17, however, is operated in conjunction with switch 51, as lead 23 is connected to both conductor 39 (to the switch 51) and conductor 41 (to the AC power source 50), and the lead 22 is connected to conductor 40 (to the switch 51). Of course, this circuitry can be modified so that the light fixture 17 can be operated by a pull chain instead of switch 51.

It is preferable, during installation, to insert a sheet of insulation (any suitable type) into interior 13, as shown in FIG. 3. This insulation includes hole **52*a* in the center thereof for the threaded number 15** to extend therethrough.

Once such connections are made, threaded member 15 of housing 11 is threadedly inserted into threaded hole **43*a* of mounting bracket 43 which is secured to electrical outlet box 35 by means of fasteners 44*a* and 44*b***.

In operation, lamp 24 is lighted when the switch 51 is closed to permit the AC power 50 to travel to the light fixture 17, and fire detector 27 is continuously operated by such AC power 50. If, however, the AC power 50 to electrical box 35 is terminated by means of a power failure, the rechargeable battery system of fire detector 27 will be activated to maintain the fire detector 27 in the smoke detecting or heat sensing mode.

Of course, it is possible to operate lamp 24 as well as fire detector 27 by means of a DC power service.

Figure 4:
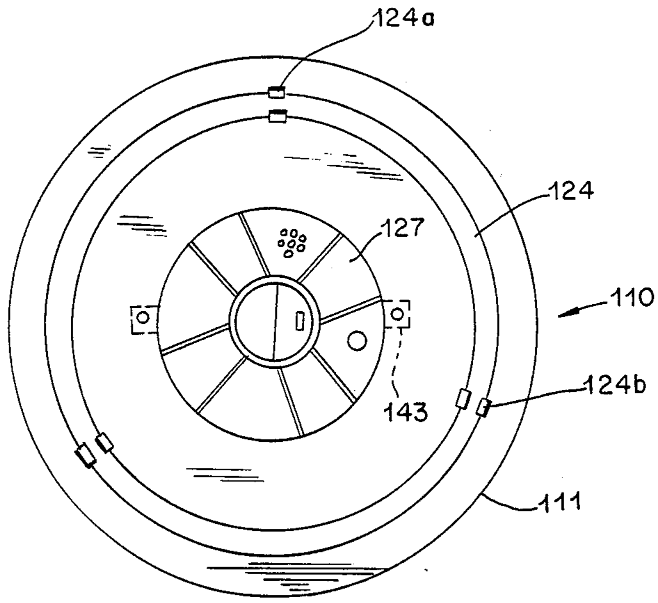
FIG. 4 is a plan view of a combined light and fire detector fixture in accordance with a second embodiment of the present invention.

Referring to FIG. 4 of the drawings, an alternate embodiment of the present invention is illustrated. In this embodiment, the combined light and fire detector fixture is particularly adapted for a fluorescent lighting system.

Thus, fixture 110 of this alternate embodiment includes a fluorescent lamp 124 secured to the housing 111 by spring clips 124*a*, 124*b* and 124*c*. Of course, fluorescent lamp 124 is electrically connected to a ballast (not shown) which can be disposed in the interior of housing 111 near the peripheral wall. It is preferable to employ a ballast which is P-rated so that heat shielding is not required and a ore efficient operation is obtained.

In this embodiment, fluorescent lamp 124 is tubular in cross-section and circular in shape thereby permitting the installation of fire detector 127 in the center of fixture 110. An elongated bracket 143 is utilized to mount fixture 110 to the recessed electrical box or ceiling.

The operation of this alternate embodiment is identical to that described above with respect to the first embodiment.

Thus, a combined light and fire detector fixture mountable on a single electrical outlet box and which need not be removed for repairs and maintenance of the fire detector, as well as providing other desirable features, has been described.

While the foregoing description and figures illustrate one preferred embodiment of the combined light and fire detector fixture in accordance with the present invention, it should be appreciated that certain modifications such as the use of a fluorescent lighting system may be made in the structure and operation of the disclosed embodiment without departing from the spirit and scope of the present invention as defined by the claims which are set forth immediately below.

What is claimed is:

1. In combination, a light and fire detector fixture comprising:

(a) a housing having an exterior and interior, and including mounting means for mounting said housing to an electrical outlet box;

(b) lamp holding means connected to said housing and including a lamp receptacle and lamp conductor means for coupling said lamp receptacle to a power source associated with said electrical outlet box; and (c) fire detecting means connected to said exterior of said housing at a location displaced along said exterior of said housing with respect to said lamp holding means, said fire detecting means including alarm means, detecting means to trigger said alarm means upon detection of a predetermined indicia of fire and fire detector conductor means for coupling said fire detecting means to said power source associated with said electrical outlet box.

2. In combination, a light and fire detector fixture as claimed in claim 1, wherein said detecting means is adapted to trigger said alarm means upon detection of smoke.

3. In combination, a light and fire detector fixture as claimed in claim 1, wherein said detecting means is adapted to trigger said alarm means upon detection of a predetermined degree of heat.

4. In combination, a light and fire detector fixture as claimed in claim 3, wherein said fire detecting means includes rectifying means to permit the same to operate on direct current power.

5. In combination, a light and fire detector fixture as claimed in claim 1, wherein said fire detecting means includes rechargeable battery means for operating the same in the event of a power failure.

6. In combination, a light and fire detector fixture as claimed in claim 1, wherein said lamp holding means is adapted for fluorescent lamp means.

7. In combination, a light and fire detector fixture as claimed in claim 1 or 2, wherein said lamp holding means is adapted for incandescent lamp means.

8. In combination, a light and fire detector fixture comprising:

(a) a housing having an exterior and interior, and including mounting means for mounting said housing to an electrical outlet box;

(b) lamp holding means connected to said housing and including a lamp receptacle and lamp conductor means for coupling said lamp receptacle to a power source associated with said electrical outlet box; and (c) fire detecting means connected to said exterior of said housing at a location displaced along said exterior of said housing with respect to said lamp holding means, said fire detecting means including alarm means, detecting means to trigger said alarm means upon detection of a predetermined indicia of fire and fire detector conductor means for coupling said fire detecting means to said power source associated with said electrical outlet box, said fire detector conductor means being independent of said lamp conductor means whereby each of said lamp receptacle and said fire detecting means can be separately coupled to said power source associated with said electrical outlet box.

9. In combination, a light and fire detector fixture as claimed in claim 8, wherein said detecting means is adapted to trigger said alarm means upon detection of smoke.

10. In combination, a light and fire detector fixture as claimed in claim 8, wherein said detecting means is adapted to trigger said alarm means upon detection of a predetermined degree of heat.

11. In combination, a light and fire detector fixture as claimed in claim 10, wherein said fire detecting means includes rectifying means to permit the same to operate on direct current power.

12. In combination, a light and fire detector fixture as claimed in claim 10, wherein said fire detecting means includes rectifying means for to permit the same to operate or direct.

13. In combination, a light and fire detector fixture as claimed in claim 8, wherein said lamp holding means is adapted for fluorescent lamp means.

14. In combination, a light and fire detector fixture as claimed in claim 8 or 9, wherein said lamp holding means is adapted for incandescent lamp means.

* * * * *

UNITED STATES PATENT AND TRADEMARK OFFICE

CERTIFICATE OF CORRECTION

PATENT NO. : 4,896,145

DATED : January 23, 1990

INVENTOR(S) : Mike Lewkowicz

It is certified that error appears in the above-identified patent and that said Letters Patent is hereby corrected as shown below:

›lumn 5, line 11, "ore" should read --more--.

›lumn 6, line 52, "claim 10" should read --claim 8--.

›lumn 6, lines 53 and 54, delete "rectifying means for to ›rmit the same to operate or direct".

›lumn 6, line 53, after "includes", insert --rechargeable ›attery means for operating the same in the event of a power ›ailure--.

Signed and Sealed this

Second Day of July, 1991

Attest:

HARRY F. MANBECK, JR.

*Attesting Officer* *Commissioner of Patents and Trademarks*